United States Patent
Sandahl

[11] Patent Number: 6,080,305
[45] Date of Patent: Jun. 27, 2000

[54] SEWAGE PURIFICATION PLANT

[76] Inventor: Tommy Sandahl, Enrisvägen 2, S-141 31 Huddinge, Sweden

[21] Appl. No.: 09/100,837

[22] Filed: Jun. 19, 1998

[51] Int. Cl.[7] .......................... B01D 17/12; B01D 21/26; B01D 21/34

[52] U.S. Cl. ..................... 210/97; 210/101; 210/198.1; 210/256; 210/259; 210/512.1

[58] Field of Search ............................. 210/97, 101, 110, 210/137, 198.1, 205, 206, 209, 256, 259, 294, 512.1, 513, 519, 702, 788, 804, 806

[56] References Cited

U.S. PATENT DOCUMENTS

| | | | |
|---|---|---|---|
| 1,642,206 | 9/1927 | Imhoff | 210/512.1 |
| 2,360,551 | 10/1944 | Durdin | 210/512.1 |
| 3,546,110 | 12/1970 | Englesson et al. | 210/256 |
| 3,570,670 | 3/1971 | Endo et al. | 210/512.1 |
| 4,780,201 | 10/1988 | Keeter et al. | 210/512.1 |

FOREIGN PATENT DOCUMENTS

| | | |
|---|---|---|
| 315853 | 10/1969 | Sweden . |
| 359080 | 8/1973 | Sweden . |
| 7013742 | 11/1974 | Sweden . |
| 7407373 | 9/1976 | Sweden . |

*Primary Examiner*—Joseph W. Drodge
*Attorney, Agent, or Firm*—Cowan, Liebowitz & Latman, P.C.; William H. Dippert

[57] ABSTRACT

An automatically operating sewage purification plant for industrial and domestic sewage systems, comprising at least one conduit for conveying untreated sewage to at least one first chamber for preliminary sedimentation in which larger solid particles are separated out, at least one second chamber which communicates with the first chamber via at least one delivery conduit and in which partially purified supernatant liquid that flows in from the first chamber undergoes a chemical purification process. Each second chamber is provided with an outlet conduit for discharging purified supernatant liquid. Each second chamber is provided in its upper part with a supernatant receiving device which receives the partially purified supernatant liquid from the first chamber and which is adapted to pivot about an axis when filled to a predetermined level and therewith deliver its load to a cyclone arrangement. The plant also includes a device for delivering to the cyclone arrangement a chemical or chemical mixture in liquid form. The cyclone arrangement has a central opening through which now purified sewage water is discharged through an outlet pipe.

13 Claims, 4 Drawing Sheets

SEWAGE PURIFICATION PLANT

The present invention relates to an automatically operating sewage purification plant. The sewage purification plant is of the kind that includes a delivery conduit through which untreated sewage is conducted to at least one first chamber, a so-called preliminary sedimentation chamber, for separating larger solid particles, at least one second chamber which communicates with the first chamber via conduit means and into which the supernatant of the first chamber passes from the first chamber through conduit means and undergoes a chemical purification process, and wherein the second chamber includes an outlet conduit for the release of the liquid treated in the second chamber to a recipient.

One object of the present invention is to provide an improved automatically functioning purification plant that has the least possible number of moving parts so as to minimize service requirements, while nevertheless ensuring reliable and effective purification of sewage that passes through the plant.

Another object of the invention is to provide a sewage purification plant which includes mechanical means for optimum metering of a given amount of additive chemical to a given volume of supernatant liquid from the first chamber.

Yet another object of the invention is to provide means for optimising agglomeration of sedimented particles with the aid of energy generated by said supernatant liquid.

Plant for automatically purifying, or cleansing, domestic sewage includes at least one conduit through which the untreated sewage is conducted to at least one first chamber, the preliminary sedimentation chamber, for separating out larger solid particles contained by the sewage, at least one second chamber which communicates with the first chamber through conduit means and in which supernatant liquid flowing in from the first chamber undergoes a chemical purification process, said second chamber being equipped with an outlet conduit through which supernatant liquid, i.e. water, treated in said second chamber is discharged therefrom.

According to one embodiment of the invention, there is arranged in the upper region of the second chamber a device which receives the supernatant liquid flowing from the first chamber, wherein said device is adapted to pivot about an axis when filled to a pre-determined level and to deliver its liquid content to an underlying cyclone arrangement, wherein this emptying movement of said is instrumental in actuating a device for delivering a chemical or chemical mixture in liquid form to said cyclone arrangement, said chemical or chemical mixture being stored in at least one separate container, and wherein the cyclone arrangement includes a central opening through which the supernatant liquid from the first chamber admixed with said chemical or chemical mixture flows down in said second chamber and is then caused to depart through an outlet conduit.

A sewage purification plant that is constructed in accordance with the invention requires no electrically or hydraulically operated devices. The unique supernatant receiving device in the second chamber of the plant constantly receives a given quantity or volume of supernatant from the first chamber and admixing of the supernatant liquid with the necessary chemical in liquid form is effected automatically and said chemical metered in said requisite quantity each time said supernatant receiving device pivots so as to discharge its load. At the end of this emptying cycle, the supernatant receiving device returns automatically to an essentially horizontal receiving position and therewith cuts-off the chemical supply.

The supernatant receiving device used in the inventive plant is adapted to include a rear space above which the orifice of the conduit means that conveys supernatant liquid from said first chamber opens out, and a front space. A partition wall of predetermined height extends transversely to the supernatant receiving device, wherein the front space has a defining wall which slopes in the sewage receiving position of said means.

The supernatant receiving device is adapted to rest on a vertical wall through the medium of an essentially V-shaped notch or recess, therewith forming a pivot plane for the supernatant receiving device.

So that the invention will be more readily understood and further features thereof made apparent, the invention will now be described in more detail with reference to exemplifying embodiments thereof and also with reference to the accompanying drawings.

FIG. 1b is a sectioned side view of the plant shown in FIG. 1a;

Figure 1:
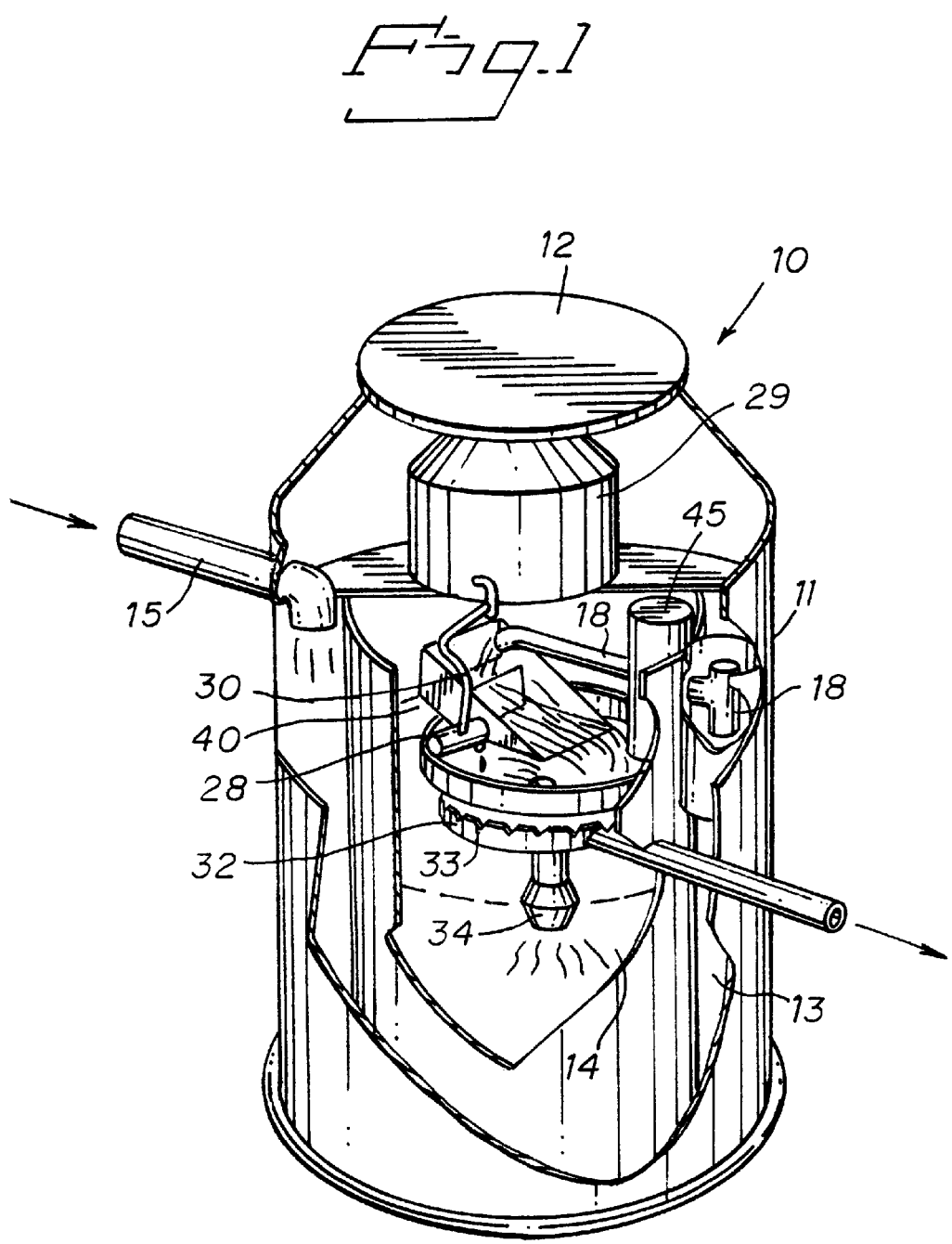
FIG. 1 is a partially sectioned, perspective view of a first embodiment of an inventive sewage purification plant.
Figure 1A:
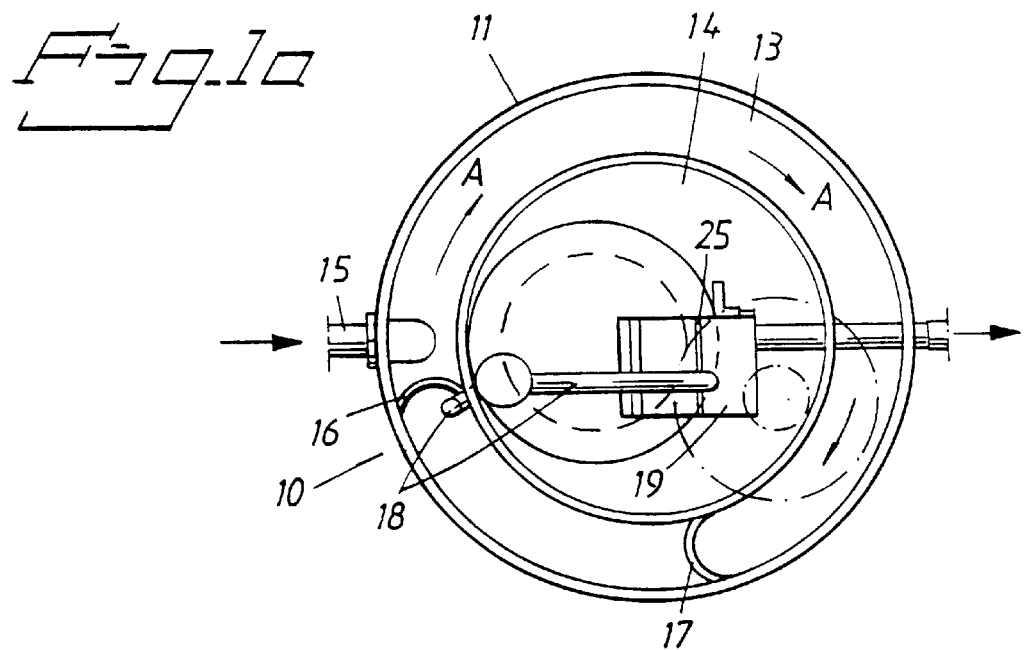
FIG. 1a shows the plant of FIG. 1 schematically from above.
Figure 1B:
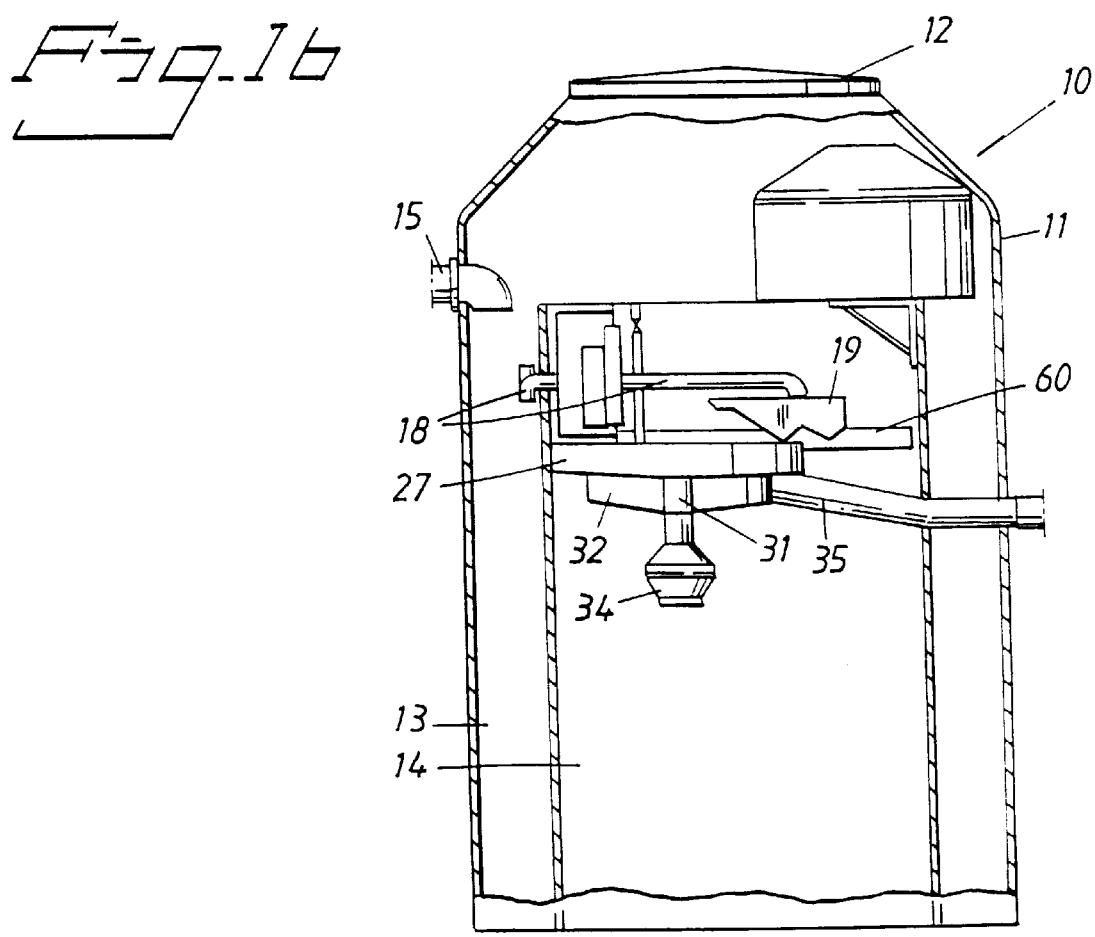

The sewage purification plant 10 illustrated in FIGS. 1, 1a and 1b is intended preferably for domestic sewage, although it may also be used for purifying industrial sewage. In the illustrated case, the entire plant is contained in a cylindrical container 11 that can be closed by means of a detachable lid or cover 12.

The cylindrical container 11 includes a first chamber 13, the so-called preliminary sedimentation chamber, which has the form of an outer annulus in FIGS. 1, 1a and 1b, and a second chamber 14 which is concentrical with the first chamber 13 and forms an inner final sedimentation chamber.

Untreated sewage flows from sources (not shown) into a delivery conduit 15 which opens into the top of the first chamber 13. The larger solids in the untreated sewage sediment out in the first sedimentation chamber 13 and settle on the bottom of the chamber 13. As will be evident from FIG. 1a, the plant includes a vertical first wall 16 which extends between the inner wall of the first chamber 13 and the outer wall of said second chamber 14. This first wall extends down to the bottom of the chamber 13 and consequently forces sewage entering through the conduit means 15 to flow clockwise in the direction of the arrows A. A second partition wall 17 includes a plurality of openings (not shown) along the whole of its vertical extension or along part of said extension.

The first chamber 13 and the second chamber 14 communicate through a conduit 18 which passes through the wall of the second chamber 14 in the upper region of said wall. It will be evident from FIGS. 1, 1a and 1b that, in the illustrated case, the volumetric capacity of the first chamber 13 is smaller than the volumetric capacity of the second chamber 14, which is preferred when the maximum volume of sewage entering the plant is about 5 m³ with each calendar day. The vertical wall 16 is disposed between the inlet conduit 15 and the supernatant delivery conduit 18.

The supernatant liquid that enters the second chamber 14 through said delivery conduit 18 for final sedimentation in a chemical purification stage contains no large particles, since these have already separated from the sewage water and settled on the bottom of the first chamber 13. The delivery conduit 18 slopes slightly downwards and opens out above a supernatant receiving device 19, which will now be described more in detail with reference to FIG. 2.

Figure 2:
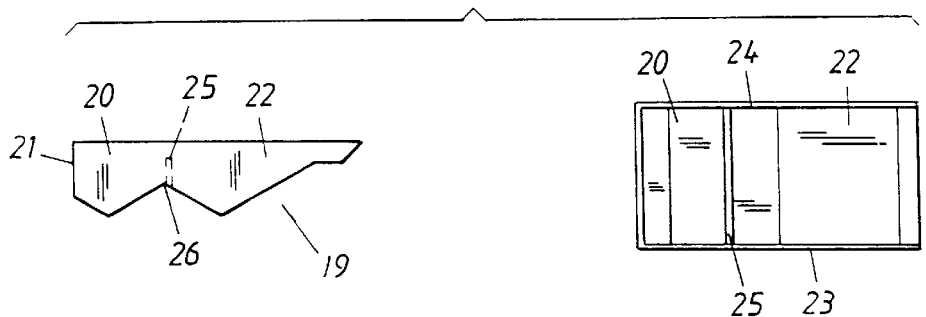
FIG. 2 is a perspective view of the supernatant receiving device in the second chamber.

As will be evident from FIG. 2, the supernatant receiving device 19 has a scoop-like shape and includes a rear space 20 defined by a rear defining wall 21, and a front space 22. Side walls 23, 24 connect with the rear defining wall 22. A vertical transverse wall 25 has an upper edge which lies beneath the upper edges of the side walls 23, 24 and separates the rear space 20 of said receiving device 19 from its front space 22. A V-shaped recess 26 is provided in the bottom of the supernatant receiving device 19, transversely thereto.

Returning now to FIGS. 1, 1*a* and 1*b*, it will be seen that the aforedescribed supernatant receiving device 19 rests via the V-shaped bottom recess 26 against a vertical wall-part of a support device (16 in FIG. 1*b*) which forms a pivot axis about which the receiving device 19 can pivot from a position in which it receives supernatant liquid entering through the delivery conduit 18 to a supernatant discharging position, whereafter said device returns automatically to its supernatant receiving position. The pivoting angle of the device 19 is restricted by coaction of the front edge of said device with the support device 60.

The supernatant delivery conduit 18 discharges above the region of the rear space 20 of the supernatant receiving device 19. Supernatant liquid flowing into the second chamber from the first chamber through the conduit 18 will thus be delivered to the rear space 20 of the device 19. When the device 19 has received a predetermined volume of liquid, it will pivot gravitationally about its pivot axis and deliver the intended volume to an underlying, circular cyclone arrangement 27. Subsequent to having delivered the intended volume, the device 19 returns to a generally horizontal receiving position as a result of the weight of the liquid volume that is kept in the rear space 20 of said device 19 by the intermediate wall 25, and is then again filled with supernatant liquid through the delivery conduit 18 as described above.

Shown at 28 is a known valve means which is actuated by the aforesaid pivotal movement of the supernatant receiving device 19. As will be seen from the drawing, the supernatant receiving device 19 has connected thereto an arm 40 which functions to open the valve as the device 19 pivots to discharge its content and therewith allows a metered, adjustable quantity of chemical to be discharged through a conduit 30 connected to the valve 28 and extending from a vessel 29 above said device 19, said chemical being discharged from said vessel under its own pressure. As the supernatant receiving device 19 returns to its receiving position, the arm 40 will move away from the valve, which therewith closes.

The cyclone arrangement 27 which receives the liquid in the device 19 imparts initially to the liquid a turbulence which causes the small contaminant particles present in the liquid to agglomerate or lump together.

As will be seen from FIG. 1*b*, the cyclone arrangement 27 includes a centrally disposed outlet 31 which extends through a weir means 32 which has a V-shaped recess 33 at its top (FIG. 1). The outlet 31 opens out beneath the weir means 32 and extends slightly beneath the weir means and co-acts with a tubular particle agglomerator 34 which has roughly the shape of two mutually facing cones and the lower part of which opens into the second chamber 14. When the turbulent supernatant liquid arrives at the particle agglomerator 34, the turbulence decreases markedly in the upper part of the agglomerator 34 and diminishes still further in the lower part thereof. Consequently, the liquid will have a generally laminar flow when it leaves the second chamber 14 at a relatively long distance from the weir means 32, and the agglomeration of particles that is commenced in the cyclone arrangement finalizes in the formation of aggregates that sink to the bottom of the second chamber 14.

The liquid, i.e. water, cleansed in the second chamber flows out through the V-shaped openings 33 in the weir means and through the outlet 35. This water can be delivered directly to a recipient.

Figure 3:
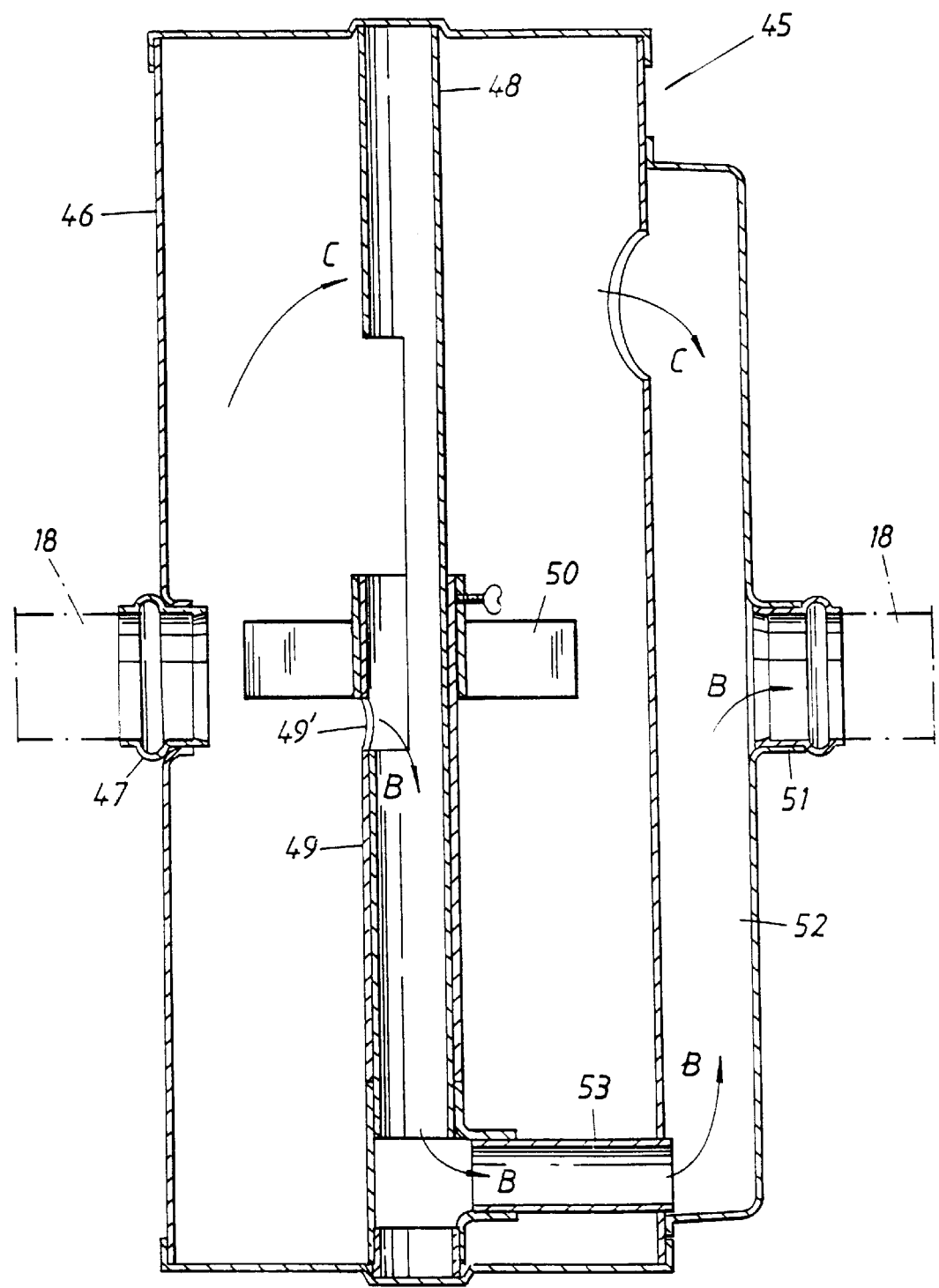
FIG. 3 illustrates an example of a load peak equalising device, which may be incorporated in the supernatant delivery conduit between the first and the second chambers.

As will be seen from FIG. 1, the delivery conduit 18 that connects the first chamber 13 to the second chamber 14 includes a device 45 which functions to equalize any loading peaks in the partially cleansed supernatant liquid that flows from the preliminary sedimentation chamber 13 to the second final sedimentation chamber 14. A preferred embodiment of this load peak equalising device is illustrated in FIG. 3, although it will be understood that the device may have other appropriate structural forms.

The illustrated equalising device 45 is comprised of an outer, first tubular body 46 which is closed at its top and bottom by means of detachable covering elements. A connector pipe 47 to which the delivery conduit 18 from the first chamber 13 is connected is provided approximately in the centre of one mantle surface of the tubular body. A second tubular body 48 that has a partially slotted mantle surface is clamped centrally between the opposing end-walls of the first tubular body 46. A third tubular body 49 surrounds the second tubular body 48 along part of its length. This third body 49 can be moved around the second tubular body 48, concentrically therewith, and includes an opening 49' whose size can be regulated by means of an adjustable float 50.

The level of the supernatant liquid in the chamber 13 will normally reach to the level of the inlet pipe 47, and the liquid will meander in the direction of the arrows B and exit via the outlet pipe 51. In the event of an inflow of greater volume such that the level of liquid in the chamber 13 rises above the level of the inlet pipe 47, the float, 50 will be lifted and therewith cause the liquid to move towards the outlet pipe 51 in the direction indicated by the arrows C.

The liquid is normally forced to exit to an expansion chamber 52 in the first tubular body 46, via a tubular member 53 provided in the lower part of the tubular body 46, whereas when equalising peak loads the liquid is forced to pass to the expansion space 52 through an opening 54 located at the top of the tubular body 46. Consequently, a uniform flow of liquid to the supernatant receiving device 19 can be ensured in the manner exemplified in FIG. 3. The equalising device 45 for equalising heavy surges or loading peaks in the inflow of supernatant liquid can be omitted, although it may be a convenient inclusion in some installations.

Figure 4:
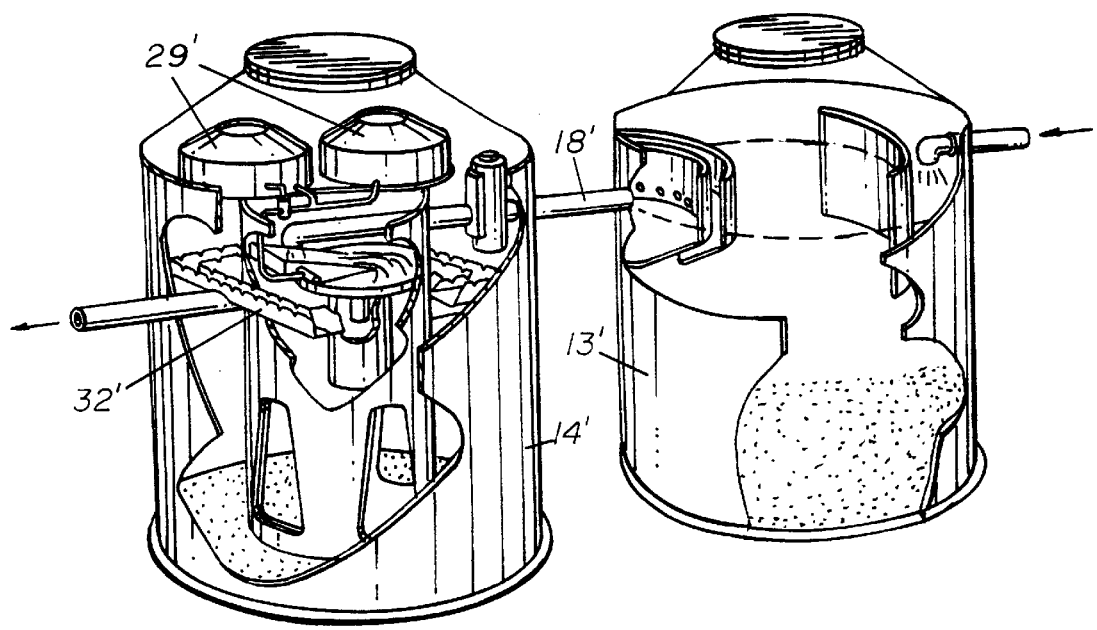
FIG. 4 illustrates a second embodiment of an improved inventive sewage purification plant, in which the first chamber, the preliminary sedimentation chamber, is comprised of a free-standing vessel.

FIG. 4 illustrates an alternative embodiment in which the so-called preliminary sedimentation chamber may comprise a vessel 13' which is separate from the second chamber and which is connected thereto by means of a connecting conduit 18', said second chamber being referenced 14' in FIG. 4. The respective chambers 13', 14' and 13, 14 have identical functions, the sole difference being that the two chambers 13', 14' can be made significantly larger and their volumetric capacities therewith increased, so as to be able to serve a larger number of domestic dwelling places.

It will also be seen from FIG. 4 that when the chamber 14' has been dimensioned for larger volumes of sewage, more than one chemical container 39' can be provided. This assumes that the supernatant receiving device 19 has been dimensioned accordingly, since the amount of chemical metered to said receiving device shall always be proportional to the volume of said device. It will also be seen from FIG. 4 that the position and design of the weir means 32 may be different to that shown in FIGS. 1, 1a and 1b.

The illustrated sewage purification plant is easily serviced, since the components in the second chamber 14 are accessible after having removed the container lid or cover 12. These components are also readily exchangeable. The chemical tank is filled from above and the plant contains no movable parts that can malfunction. The valve arrangement used to control the liquid chemical mixture may be of a known kind. The chemical may be chemically saturated aluminium sulphate, although other chemicals may be used, such as ferrous chloride, ferric chloride, polyaluminium chloride or sodium aluminate. The sediment is removed from the bottoms of respective chambers 13, 14 and 13', 14' when so required, with the aid of an appropriate pump means, normally from one to three times per year.

I claim:

1. An automatically operating sewage purification plant for industrial and domestic sewage systems comprising at least one conduit for conveying untreated sewage to at least one first chamber which functions as a preliminary sedimentation chamber in which larger solid particles are separated out, at least one second chamber which communicates with the first chamber via at least one delivery conduit and in which partially purified supernatant liquid that flows in from the first chamber undergoes a chemical purification process, said second chamber being provided with an outlet conduit for discharging the purified supernatant liquid from the second chamber, characterized in that the second chamber is provided in its upper part with a supernatant receiving device that receives the partially purified supernatant liquid from the first chamber; in that the receiving device is adapted to pivot about an axis when filled to a predetermined level and therewith deliver its load to a cyclone arrangement within the second chamber; in that said plant includes means for delivering to the cyclone arrangement a chemical or chemical mixture in liquid form from at least one separate container; in that the cyclone arrangement has a central opening through which said chemical or chemical mixture mixed with the now purified liquid flows into the second chamber, in that said plant includes an outlet pipe for discharging said purified liquid.

2. Plant according to claim 1, characterized in that the receiving device has the form of a scoop; and in that the axis about which said scoop pivots is comprised of a vertical edge that co-acts with a recess in the underside of the scoop.

3. Plant according to claim 2, characterized in that the scoop is divided into a rear and a front space by a vertical wall; in that a discharge orifice of the deliver conduit is located above the rear space in the scoop, wherein supernatant liquid entering said rear space is forced over the vertical wall and into the front space of the scoop and therewith causes the scoop to pivot when said front space is filled to a predetermined level and therewith deliver its contents to said second chamber, wherein the scoop returns to its receiving or filling position by gravitational force of any liquid that remains in said rear space.

4. Plant according to claim 2, chararacterized in that the scoop co-acts with an arm connected to a valve such that pivoting of the scoop to empty its load opens the valve and permits the release of a chemical from said separate container in an amount in with the volumetric content of the scoop and the delivery position of said scoop; and in that the scoop entrains the arm as it returned to its pre-pivoting position and therewith closes the valve.

5. Plant according to claim 1, characterized in that the cyclone arrangement imparts turbulence to the partially purified liquid mixed with at least one chemical and delivered by the scoop, wherein an outlet of said cyclone arrangement is connected with means for imparting an optimum laminar flow to liquid flowing therethrough before it flows out into the second chamber.

6. Plant according to claim 5, characterized in that the cyclone arrangement is connected directly with a weir means which communicates with the second chamber via openings and with said outlet pipe for discharging purified liquid from the second chamber.

7. Plant according to claim 6, characterized in that an underside of the weir means is connected with means for converting the turbulence of the partially purified liquid to a laminar flow through a converting means outlet.

8. Plant according to claim 7, characterized in that said turbulence converting means has the form of two mutually opposing cones; and in that said converting means outlet is located beneath the outlet pipe connected to said weir means.

9. Plant according to claim 8, characterized by vertical walls provided between the first and the second chambers for controlling movement of particles in the sewage conveyed from the untreated sewage conduit.

10. Plant according to claim 1, characterized in that the first chamber and the second chamber are integrated into a single container, wherein the first chamber concentrically surrounds the second chamber.

11. Plant according to claim 1 characterized by a flow regulator which co-acts with the delivery conduit to equalize any load peaks in the inflow of supernatant liquid.

12. Plant according to claim 1, characterized in that the first chamber comprises a container which is distanced from the second chamber.

13. Plant according to claim 12, characterized in that the second chamber includes at least two of the separate containers.

* * * * *